United States Patent
Zhang

(10) Patent No.: US 11,483,455 B2
(45) Date of Patent: Oct. 25, 2022

(54) PROTECTIVE CONNECTOR AND LENS MODULE

(71) Applicant: TRIPLE WIN TECHNOLOGY (SHENZHEN) CO. LTD., Shenzhen (CN)

(72) Inventor: Wei Zhang, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 90 days.

(21) Appl. No.: 17/038,163

(22) Filed: Sep. 30, 2020

(65) Prior Publication Data

US 2021/0385358 A1 Dec. 9, 2021

(30) Foreign Application Priority Data

Jun. 9, 2020 (CN) .......................... 202010519809.0

(51) Int. Cl.
*H04N 5/225* (2006.01)
*G02B 7/02* (2021.01)

(52) U.S. Cl.
CPC ......... *H04N 5/2252* (2013.01); *H04N 5/2254* (2013.01); *G02B 7/022* (2013.01); *G02B 7/025* (2013.01)

(58) Field of Classification Search
CPC ...... G02B 7/022; G02B 7/025; H04N 5/2252; H04N 5/2254
See application file for complete search history.

(56) References Cited

U.S. PATENT DOCUMENTS

| | | | | |
|---|---|---|---|---|
| 10,054,840 | B2 * | 8/2018 | Ha | ...................... H04N 5/23264 |
| 2010/0060747 | A1 * | 3/2010 | Woodman | .............. G03B 17/02 |
| | | | | 348/222.1 |
| 2011/0216237 | A1 * | 9/2011 | Shinohara | ............ H04N 5/2252 |
| | | | | 348/E5.026 |
| 2015/0253583 | A1 * | 9/2015 | Cho | ...................... G02B 27/646 |
| | | | | 359/557 |
| 2017/0153441 | A1 * | 6/2017 | Ishizuka | .............. H01R 13/405 |
| 2018/0198897 | A1 * | 7/2018 | Tang | ................... H04M 1/0264 |
| 2018/0329059 | A1 * | 11/2018 | Liu | ......................... G01S 7/4813 |
| 2019/0129076 | A1 * | 5/2019 | Choi | ........................ G02B 7/02 |
| 2020/0145560 | A1 * | 5/2020 | Han | ....................... G03B 17/08 |
| 2022/0026706 | A1 * | 1/2022 | Xu | ..................... G02B 26/0825 |

FOREIGN PATENT DOCUMENTS

TW 200831906 A 8/2008

* cited by examiner

Primary Examiner — Amy R Hsu

(74) Attorney, Agent, or Firm — ScienBiziP, P.C.

(57) ABSTRACT

A protective connector having a good connection reliability includes a main body, a plurality of conductive circuits embedded in the main body, two first conductive blocks formed on the main body, and two second conductive blocks formed on the main body and opposite to the two first conductive blocks. The two first conductive blocks and the two second conductive blocks are electrically connected to one of the plurality of conductive circuits, respectively. The disclosure further relates to a lens module.

9 Claims, 6 Drawing Sheets

PROTECTIVE CONNECTOR AND LENS MODULE

FIELD

The subject matter of the application generally relates to a protective connector and a lens module.

BACKGROUND

Connectors are generally connected to components by glue dispensing. Therefore, the connection between the connectors and the components is limited to glue and dispensing machines. Once the glue or dispensing machines becomes abnormal, the connectors may scrap and have a poor conductivity. Baking is required after glue dispensing, which makes a manufacturing process for connecting the connectors and the components become more complicated. In addition, wires of the connector are exposed, resulting in a short service life of the connector.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
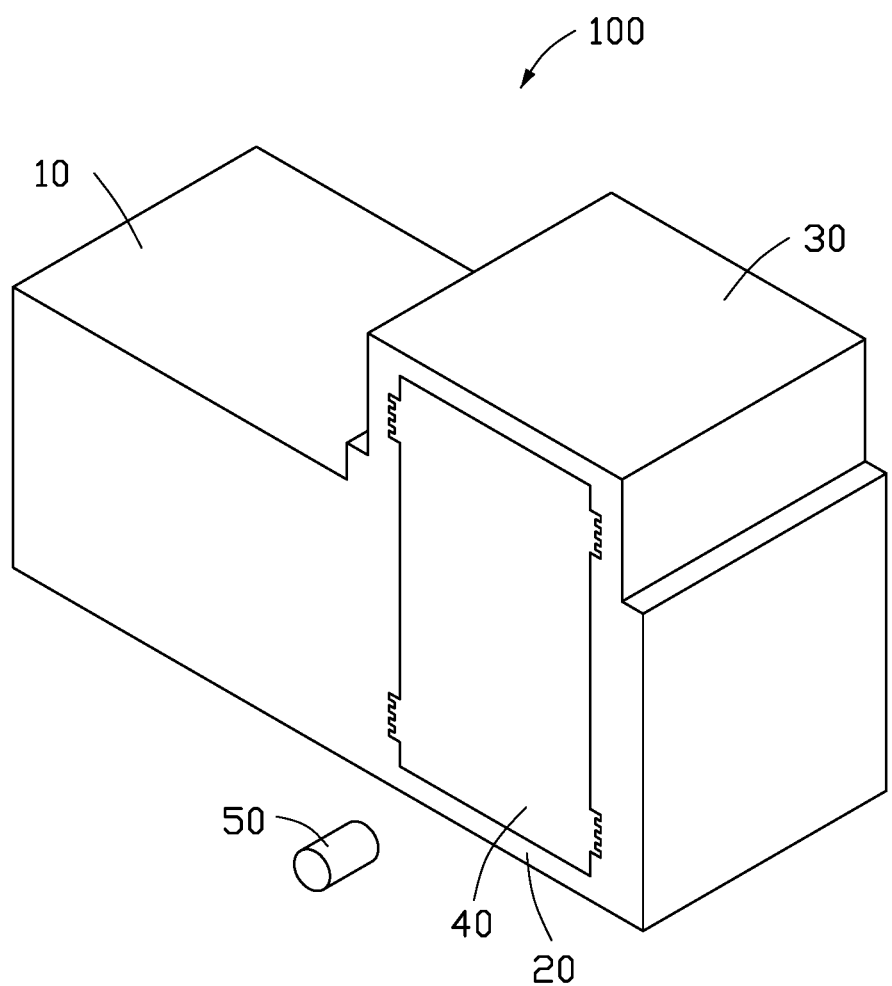
FIG. 1 is a perspective view of an embodiment of a lens module with an ultraviolet adhesive according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

Figure 2:
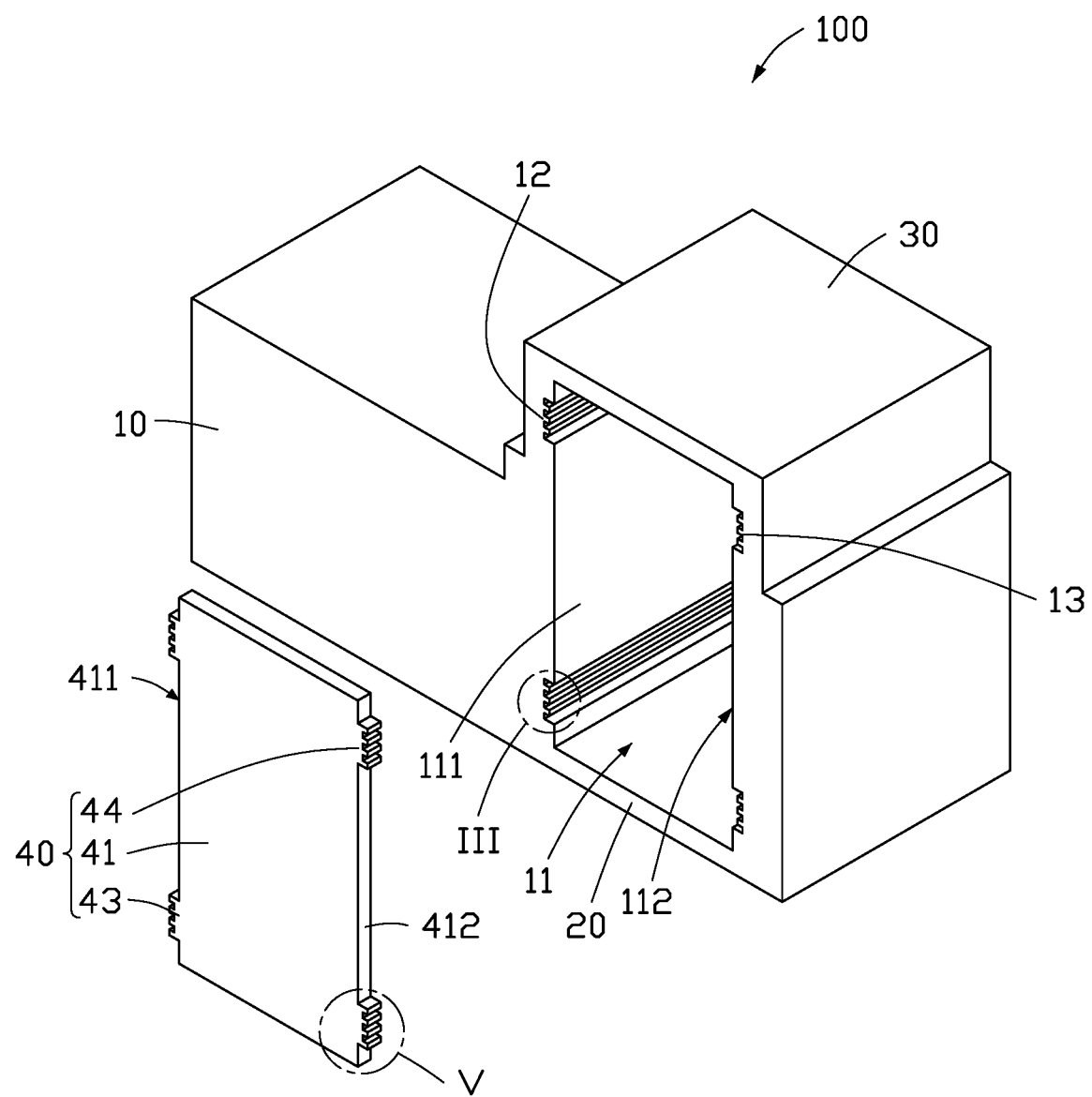
FIG. 2 is an exploded view of the lens module of FIG. 1.

FIGS. 1-2 show an embodiment of a lens module 100. The lens module 100 includes a lens assembly 10, a printed circuit board 20, a diffraction optical component 30, a protective connector 40, and a plurality of ultraviolet adhesives 50. The lens assembly 10 is formed on the printed circuit board 20 and electrically connected to the printed circuit board 20. The diffraction optical component 30 is formed on one end of the lens assembly 10 and away from the printed circuit board 20. The protective connector 40 is connected to the lens assembly 10. The plurality of ultraviolet adhesives 50 are used to fix the lens assembly 10 and the protective connector 40.

In at least one embodiment, the lens assembly 10 includes a lens cone, a lens holder, and a lens. In other embodiment, the lens assembly 10 includes a voice coil motor, a lens holder, and a lens.

In at least one embodiment, referring to FIG. 2, a groove 11 is defined in the lens assembly 10. The groove 11 includes a first inner wall 111 and a second inner wall 112 opposite to the first inner wall 111. Two first receiving grooves 12 are defined in the first inner wall 111. One of the two first receiving grooves 12 is adjacent to the diffraction optical component 30, and the other of the two first receiving grooves 12 is adjacent to the printed circuit board 20. Two second receiving grooves 13 are defined in the second inner wall 112. One of the two second receiving grooves 13 is adjacent to the diffraction optical component 30, and the other of the two second receiving grooves 13 is adjacent to the printed circuit board 20.

Figure 3:
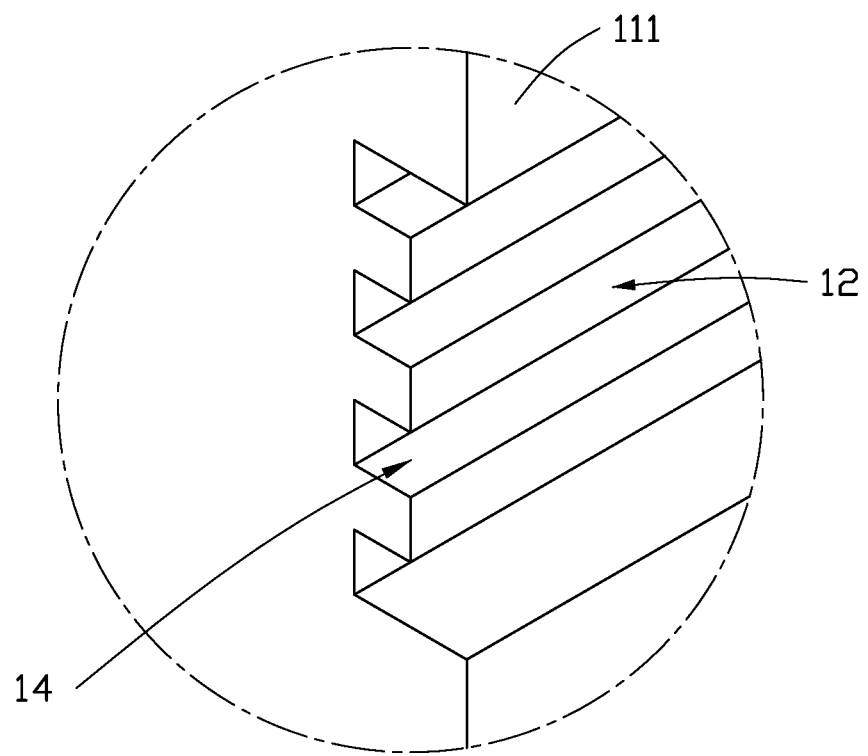
FIG. 3 is a partial enlarged view of a portion labeled III in FIG. 2 of a lens assembly with a first receiving groove of the lens module.

In at least one embodiment, referring to FIG. 3, two second microstructures 14 are defined in a bottom of each of the first receiving groove 12 and a bottom of each of the second receiving groove 13. That is, there is one of the two second microstructures 14 in the bottom of each of the first receiving groove 12, and there is the other of the two second microstructures 14 in the bottom of each of the second receiving groove 13.

The protective connector 40 is used to prevent a current flowing through the lens module 100 from being overloaded.

Figure 4:
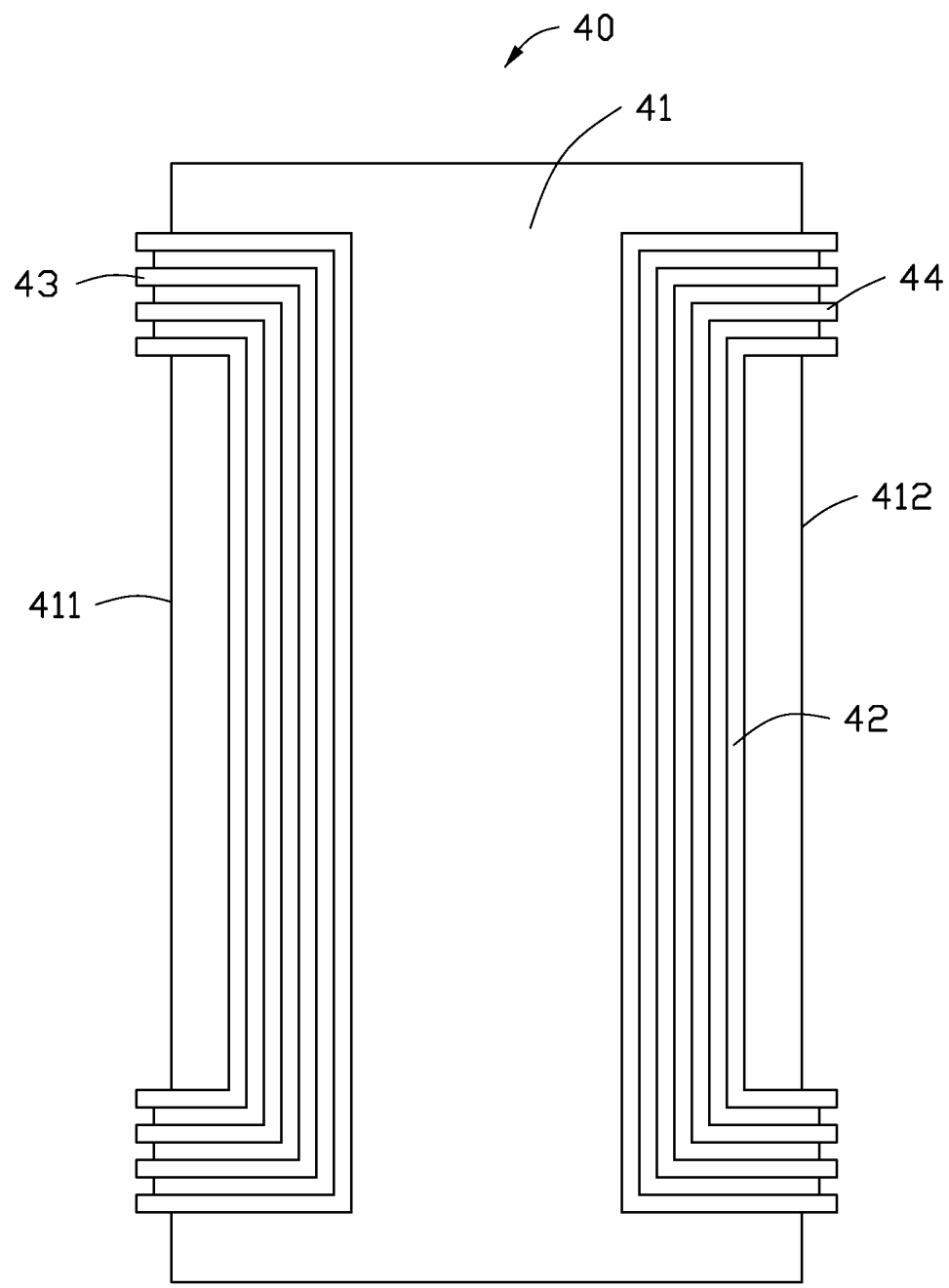
FIG. 4 is a perspective view of inner circuits of a protective connector of the lens module of FIG. 2.
Figure 5:
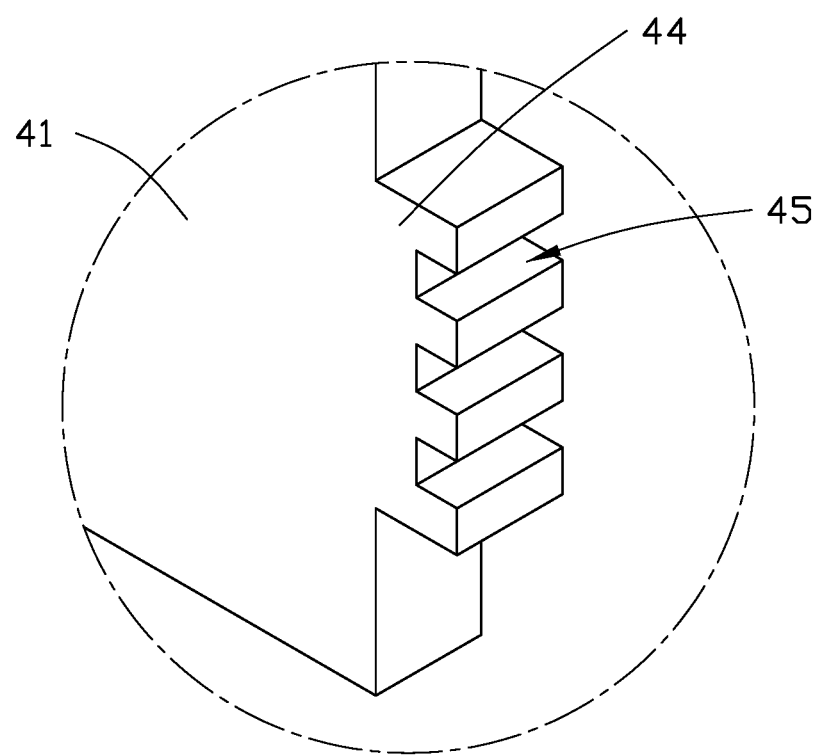
FIG. 5 is a partial enlarged view of a portion labeled V in FIG. 2 of a protective connector with a first conductive block of the lens module.

In at least one embodiment, referring to FIGS. 2, 4, and 5, the protective connector 40 includes a main body 41, a plurality of conductive circuits 42, two first conductive blocks 43 and two second conductive blocks 44. The plurality of conductive circuits 42 is embedded in the main body 41. The two first conductive blocks 43 and the two second conductive blocks 44 are respectively formed on two opposite surfaces of the main body 41. The two first conductive blocks 43 and the two second conductive blocks 44 are electrically connected to one of the plurality of conductive circuits 42, respectively. In at least one embodiment, the two first conductive blocks 43 are electrically connected to two ends of one of the plurality of conductive circuits 42, and the two second conductive blocks 44 are electrically connected to two ends of the another of the plurality of conductive circuits 42.

The main body 41 includes a first side surface 411 and a second side surface 42 opposite to the first side surface 411. The two first conductive blocks 43 are formed on the first side surface 411, and the two second conductive blocks 44 are formed on the second side surface 412.

The two first conductive blocks 43 are received in the two first receiving grooves 12. The two first conductive blocks 43 and the two first receiving grooves 12 are connected by a tight fit. The two second conductive blocks 44 are received in the two second receiving grooves 13. The two second conductive blocks 44 and the second receiving groove 13 are connected by a tight fit.

The first two conductive blocks 43 are fixed to the first receiving groove 12 by the ultraviolet adhesives 50. The second two conductive blocks 44 are fixed to the second receiving groove 13 by the ultraviolet adhesives 50.

In at least one embodiment, a plurality of first microstructures 45 are defined in each of the two first conductive blocks 43 and each of the second conductive blocks 44. The plurality of first microstructures 45 is away from the main body 41. The plurality of second microstructures 14 matches with the plurality of first microstructures 45.

The two first conductive blocks 43, the second conductive blocks 44, the two first receiving grooves 12, and the two second receiving grooves 13 can increase a contact area between the protective connector 40 and the lens assembly 10, therefore increasing an electrical conductivity between the protective connector 40 and the lens assembly 10.

The plurality of second microstructures 14 and the plurality of first microstructures 45 can increase a contact area between the protective connector 40 and the lens assembly 10, therefore increasing an electrical conductivity and a connection reliability between the protective connector 40 and the lens assembly 10.

In at least one embodiment, materials of the plurality of conductive circuits 42 are red copper, and a material of the main body 41 is plastic. The plurality of conductive circuits 42 and the main body 41 are die-casted together by an injection molding mold. The plurality of conductive circuits 42 are embedded in the main body 41 to protect the plurality of conductive circuits 42 and avoid damage or short circuit caused by an external force, thereby increasing a service life of the protective connector 40.

The ultraviolet adhesives 50 are further formed on the diffraction optical component 30, thereby increasing a connection reliability between the protection connector 40, the lens assembly 10, and the diffractive optical component 30, and reducing a risk of the protective connector 40 and the diffractive optical component 30 falling off the lens assembly 10.

Figure 6:
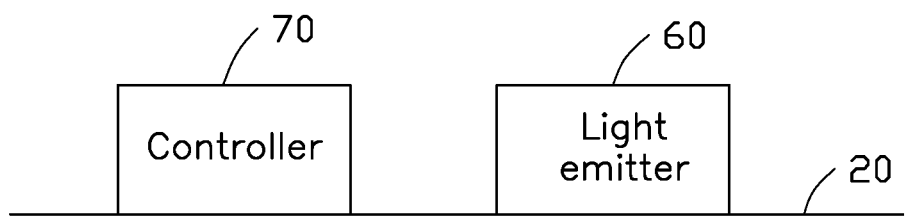
FIG. 6 is a perspective view of a printed circuit board with a controller and a light emitter of the lens module of FIG. 2.

Referring to FIG. 6, the lens module 100 further includes a light emitter 60 and a controller 70. The light emitter 60 and the controller 70 are both formed on the printed circuit board 20. The light emitter 60 and the controller 70 are both electrically connected to the printed circuit board 20 respectively. The light emitter 60 is used to emit light. The controller 70 is used to receive a signal from a light receiver (not shown) that the light is weakened and control internal circuits of the printed circuit board 20 to be disconnected, so that the light emitter 60 stops emitting light.

Light emitted by the light emitter 60 passes through the lens assembly 10 and the diffractive optical component 30 and forms an image. The light receiver receives the light and determines whether the received light is weakened. If the received light is weakened, it means that there is light leakage in the lens module 100, and the light receiver sends a signal to the controller 70. The controller 70 receives the signal and controls the internal circuits of the printed circuit board 20 to be disconnected, and the light emitter 60 stops emitting light.

With the embodiments described above, firstly, the two first conductive blocks 43, the second conductive blocks 44, the two first receiving grooves 12, and the two second receiving grooves 13 can increase a contact area between the protective connector 40 and the lens assembly 10, therefore increasing an electrical conductivity between the protective connector 40 and the lens assembly 10. Secondly, the plurality of second microstructures 14 and the plurality of first microstructures 45 can increase a contact area between the protective connector 40 and the lens assembly 10, therefore increasing an electrical conductivity and a connection reliability between the protective connector 40 and the lens assembly 10. Thirdly, the plurality of conductive circuits 42 are embedded in the main body 41 to protect the plurality of conductive circuits 42 and avoid damage or short circuit caused by an external force, thereby increasing a service life of the protective connector. Fourthly, The ultraviolet adhesives 50 are also formed on the diffraction optical component 30, the lens assembly 10, and the protective connector 40, thereby increasing a connection reliability between the protection connector 40, the lens assembly 10, and the diffractive optical component 30, and reducing a risk of the protective connector 40 and the diffractive optical component 30 falling off the lens assembly 10.

The embodiments shown and described above are only examples. Many details are often found in the art such as the other features of a protective connector and a lens module. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A lens module comprising:
   a lens assembly; wherein the lens assembly comprises a groove; the groove comprises a first inner wall and a second inner wall opposite to the first inner wall; two first receiving grooves are defined in the first inner wall; and two second receiving grooves are defined in the second inner wall; and
   a protective connector; wherein the protective connector comprises:
   a main body;
   a plurality of conductive circuits embedded in the main body;
   two first conductive blocks on the main body;
   two second conductive blocks on the main body and opposite to the two first conductive blocks; wherein each of the two first conductive blocks and each of the two second conductive blocks are electrically connected to a respective one of the plurality of conductive circuits; each of the two first conductive blocks is received in a corresponding one of the two first receiving grooves; and each of the two second conductive blocks is received in a corresponding one of the two second receiving grooves; and the protective connector is electrically connected to the lens assembly by the two first conductive blocks and the two second conductive blocks, respectively.

2. The lens module of claim 1, wherein a plurality of first microstructures are defined in each of the two first conductive blocks and each of the second conductive blocks; two second microstructures are defined in a bottom of each of the first receiving groove and a bottom of each of the second receiving groove; and the plurality of second microstructures matches in profile with the plurality of first microstructures.

3. The lens module of claim 1, wherein the plurality of conductive circuits and the main body are die-casted by an injection molding mold.

4. The lens module of claim 1, the two first conductive blocks are electrically connected to two ends of one of the plurality of conductive circuits, and the two second conductive blocks are electrically connected to another two ends of the plurality of conductive circuits.

5. The lens module of claim 1, wherein the first two conductive blocks are fixed to the first receiving groove by ultraviolet adhesives.

6. The lens module of claim 5, wherein the second two conductive blocks are fixed to the second receiving groove by ultraviolet adhesives.

7. The lens module of claim 6, further comprising a printed circuit board and a diffraction optical component; the lens assembly is on the printed circuit board and electrically connected to the printed circuit board; the diffraction optical component is on one end of the lens assembly and away from the printed circuit board.

8. The lens module of claim 7, wherein the ultraviolet adhesives are on the diffraction optical component.

9. The lens module of claim 7, further comprising a light emitter and a controller; wherein each of the light emitter and the controller is on the printed circuit board; each of the light emitter and the controller is electrically connected to the printed circuit board.

\* \* \* \* \*